United States Patent [19]

Morris

[11] Patent Number: 4,956,996
[45] Date of Patent: Sep. 18, 1990

[54] TANK GAUGING APPARATUS AND METHOD

[75] Inventor: Brian G. Morris, Houston, Tex.

[73] Assignee: The United States of America as represented by the Administrator of the National Aeronautics and Space Administration, Washington, D.C.

[21] Appl. No.: 396,726

[22] Filed: Aug. 18, 1989

Related U.S. Application Data

[63] Continuation of Ser. No. 217,725, Jul. 11, 1988, abandoned.

[51] Int. Cl.$^5$ ............................................. G01F 17/00
[52] U.S. Cl. ................................................. 73/149
[58] Field of Search ........................................... 73/149

[56] References Cited

U.S. PATENT DOCUMENTS

| | | | |
|---|---|---|---|
| 3,234,785 | 2/1966 | Rimsha | 73/113 |
| 3,237,451 | 3/1966 | Haeff | 73/149 |
| 3,357,245 | 12/1967 | Wolfrum | 73/290 |
| 3,411,351 | 11/1968 | Schwartz | 73/149 |
| 3,486,374 | 12/1969 | Wright | 73/149 |
| 3,624,828 | 11/1971 | Edwards | 73/149 |
| 3,745,338 | 7/1973 | Joyce | 250/43.5 FL |

FOREIGN PATENT DOCUMENTS

| | | | |
|---|---|---|---|
| 0020814 | 2/1984 | Japan | 73/149 |
| 0232536 | 4/1969 | U.S.S.R. | 73/149 |

Primary Examiner—Robert Raevis
Attorney, Agent, or Firm—Edward K. Fein; John R. Manning; Russell E. Schlorff

[57] ABSTRACT

Apparatus for gauging the amount of liquid in a container of liquid and gas under low or zero gravity net conditions includes an accumulator and appropriate connector apparatus for communicating gas between the accumulator and the container. In one form of the invention, gas is removed from the container and compressed into the accumulator. The pressure and temperature of the fluid in the container is measured before and after removal of the gas; the pressure and temperature of gas in the accumulator is measured before and after compression of the gas into the accumulator from the container. These pressure and temperature measurements are used in determining the volume of gas in the container, whereby the volume of liquid in the container can be determined from the difference between the known volume of the container and the volume of gas in the container. Gas from the accumulator may be communicated into the container in a similar process as a verification of the gauging of the liquid volume, or as an independent process for determining the volume of liquid in the container.

6 Claims, 1 Drawing Sheet

TANK GAUGING APPARATUS AND METHOD

The invention described herein was made by an employee of the United States Government and may be manufactured and used by or for the Government of the United States of America for governmental purposes without the payment of any royalties thereon or therefor.

This is a continuation of application Ser. No. 07/217,725, filed 7/11/88 now abandoned.

BACKGROUND OF THE INVENTION

1. Field of the Invention

The present invention pertains to methods and apparatus for determining the amount of liquid in a container. More particularly, the present invention is related to techniques for gauging liquid quantities in containers in low or zero net gravity environments, such as in the case of satellites or other space vehicles.

2. Description of the Prior Art

The determination of the amount of liquid in a container in which both gas and liquid are present poses a considerable problem in zero, or near-zero, net gravity environments such as encountered in earth orbit or other space travel. For example, it may be necessary to gauge the amount of liquid fuel in a satellite or space station fuel tank. Typically, a tank for storing liquid that is removed therefrom as needed also contains a pressurant gas for maintaining the liquid under appropriate pressure to permit the liquid to be tapped off of the tank. However, due to the lack of gravitational forces, the liquid and gas are generally completely mixed throughout the volume of the tank, absent the use of any techniques to separate the two and gather the liquid toward one region of the tank. Consequently, the gauging of the amount of liquid in the container is not readily carried out.

Several techniques are known for attempting to gauge liquid in a container under such circumstances. For example, the container may be accelerated to settle the liquid to a specific location in the container, then the level of the liquid at that location may be determined with a level detector, or liquid/gas interface sensor. However, so accelerating the container requires a complicated propulsive system to produce the accelerating force, which also affects the entire system of which the container is a part. Another technique utilizes the container, or tank, in a blowdown mode. After the tank containing liquid is pressured with the pressurant gas, the tank is isolated from the pressurant supply. Then, as liquid is withdrawn from the tank, the change in pressure within the tank is detected and the related expansion of the pressurant is determined to determine the quantity of liquid remaining within the tank. However, utilizing the tank in a blowdown mode results in a decrease in the liquid withdrawal rate as the pressure in the tank is reduced. Therefore, in order to achieve a desired flow rate at the diminished tank pressure, the initial tank pressure must be increased, resulting in a heavier initial tank weight. Furthermore, any gas leakage from the tank produces an error in the gauging of the liquid remaining. Yet another technique requires use of a dedicated pressurant tank from which gas may be supplied to the liquid container by means of a pressure regulator. The amount of liquid in the tank can thus be determined by gauging the quantity of pressurant gas added to the tank containing the liquid. However, such technique obviously requires a dedicated pressurant tank, and leakage of the pressurant gas may be mistaken for liquid loss. Further, of the aforementioned techniques, only the first technique resulting in settling of the liquid in one region of the container is usable for gauging cryogenic liquids.

It is an object of the present invention to provide a method and apparatus for gauging the liquid in a container under zero, or near-zero, net gravitational force without the need for a special propulsive system, or any acceleration to be imposed on the container or the system of which the container is a part.

It is a further object of the present invention to provide such a technique without the need for a dedicated gas pressurant source, and without the need for an increase in tank working pressure and weight to accommodate operation in a blowdown expulsion mode.

SUMMARY OF THE INVENTION

The present invention provides apparatus for gauging the amount of liquid in a container at zero, or near-zero, net gravitational conditions, and includes an accumulator and a compressor for compressing pressurant gas from the container into the accumulator. Appropriate connectors are provided for connecting the compressor and accumulator to the container, and sensors are included to measure the pressure and temperature in the container and in the accumulator. Gas from the compressor may pass through a radiator to remove heat of compression of the gas. Additionally, the compressor may have interstage cooling to maintain safe temperatures for reactive gases and vapors. A computer operated controller may be provided for receiving the sensor measurements of the pressure and temperature and for operating the compressor.

In a method of the invention, an accumulator and associated compressor are provided with connectors to the container of liquid and pressurant gas. The pressure and temperature of fluid in the container are measured, and the pressure and temperature of gas in the accumulator are measured. Gas is then pumped from the container and into the accumulator by means of the compressor. A radiator may be provided to remove the heat of compression of the gas being pumped into the accumulator. The pressure and temperature measurements are taken again, and the gas law is applied to determine the volume of gas in the container, whereby the volume of liquid in the container may be determined.

In a variation of the method of the invention, the pressure and temperature measurements are made, gas is communicated from the accumulator to the container and the pressure and temperature measurements are made again. Application of the gas law is then made to determine the volume of the liquid in the container.

DESCRIPTION OF PREFERRED EMBODIMENTS

Figure 1:
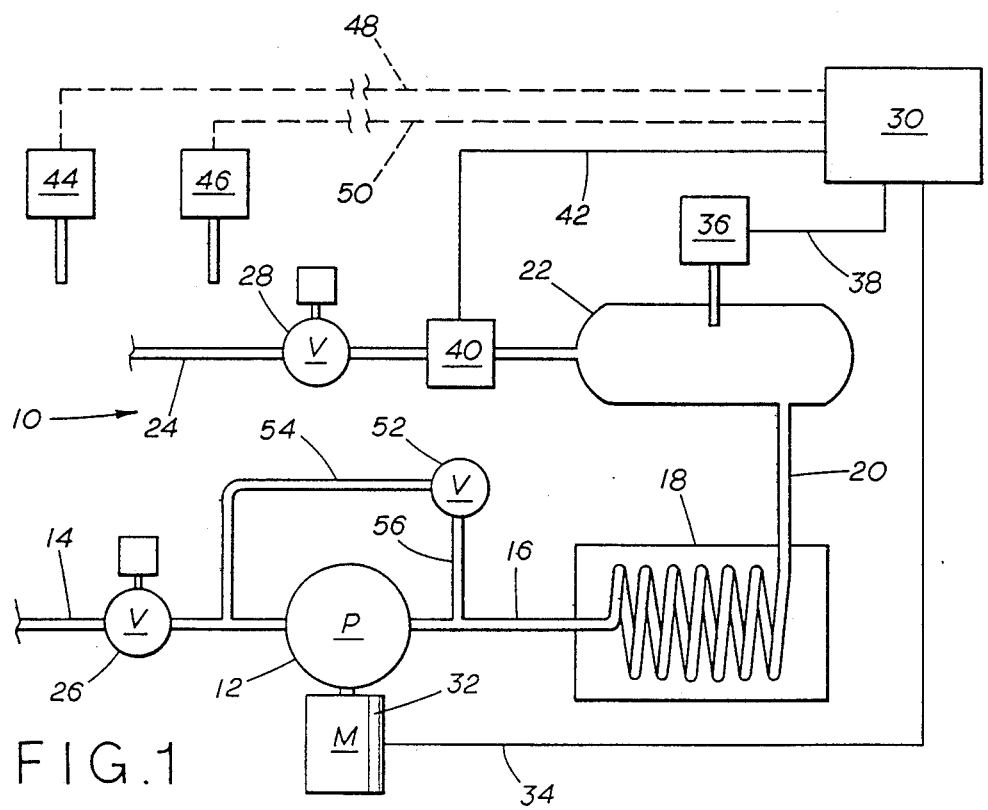
FIG. 1 is a schematic illustration of a gauging system for use in determining the volume of liquid in a container in a zero, or near-zero gravity environment according to the present invention.

A system for determining the amount of liquid in a container in zero, or near-zero, net gravitational conditions according to the present invention is shown generally at 10 in FIG. 1. The container, in the form of a tank, for example, initially holds liquid whose volume is to be determined, along with pressurant gas used to maintain a sufficient pressure within the tank to enable the liquid to be tapped off of the tank for appropriate use. Such a system may be employed, for example, as a liquid fuel supply in a satellite or other space vehicle operating in a net reduced gravitational condition. The gauging system 10 includes a compressor, or pump, 12 which is used in removing the pressurant gas from the tank (not shown) by way of a gas communication line 14. The compressed gas is communicated by a line 16 to a radiator 18, and gas output from the radiator is communicated by a line 20 to an accumulator 22. In general, the volume of the accumulator 22 may be considerably smaller than the volume of the main tank containing the liquid whose quantity is to be determined. Typically, the volume of the accumulator may be in the range of 0.001 of the main tank volume. Accordingly, the compressor may have a boost ratio on the order of 100:1, depending on the required accuracy of the measuring process and the system weight. Since the gas being pumped from the main tank to the accumulator is being compressed, the radiator 18 is provided to remove the heat of compression from the compressed gas. In the case where compression ratio is high and temperatures must be limited for safe and reliable operation, interstage cooling of the compressor may be necessary. Since use of the compressor is intermittent, the necessary cooling may be achieved by jacketing specific areas and filling the jackets with phase-change materials (normally salts). Radiating fins may be added for reversal of the phase-change. Otherwise, more conventional cooling employing a heat transfer fluid, pump, and radiator may be employed.

After appropriate measurements are made on the gas removed from the main tank, gas may be returned to the main tank from the gauging system 10 by a return line 24. The gas intake line 14 is provided with an isolation valve 26. An isolation valve 28 is also provided in the gas return line 24.

The system 10 may be provided with a controller 30 to operate the system. The controller 30, which may be a computer, or computer operated, thus controls the operation of a motor 32, which drives the compressor 12, by means of an appropriate power or operating signal line 34. Pressure and temperature conditions in the accumulator 22 and connecting lines, as well as pressure and temperature conditions in the main tank, must be determined. Appropriate sensors are provided for acquiring such information. The sensors may be connected to the controller 30 for communicating the pressure and temperature information directly to the controller which, in turn, may operate to carry out the calculations to determine the amount of liquid in the main tank, as discussed in detail hereinafter. The pressure and temperature sensing devices may be of any appropriate types, and which are generally known in the art and need not be described in detail herein. In general, such sensors provide electrical output signals reflecting the values of temperature and pressure sensed. Accordingly, a temperature sensor 36 is positioned to probe the temperature of gas in the accumulator 22, and conveys its output signal to the controller 30 by an appropriate communication line 38. A pressure sensor 40 is similarly situated, here in the output line from the accumulator 22, to determine the pressure of the gas in the accumulator and associated communication lines, and conveys its output signal to the controller 30 by an appropriate communication line 42. Temperature and pressure sensors 44 and 46 are positioned to determine the corresponding quantity values in the main tank (not shown), and appropriately communicate their respective output signals to the controller 30 over communication lines 48 and 50, respectively. It will be appreciated that any one or more of the signal communication lines 38, 42, 48 and 50 may be deleted and radio or other appropriate communication signals may be utilized to convey temperature and/or pressure information to the controller 30.

Operation of the system 10 by means of the controller 30 is also a safety measure, since the controller may continuously monitor the pressure and temperature conditions in the system as well as the main tank, and cease operation of the compressor 12, for example, in the event of threatening pressure buildup. However, a relief valve 52 is provided as a backup to the controller 30 to prevent overpressure. The relief valve 52 communicates with the compressor input line 14 as well as the compressor output line 16 by means of connecting lines 54 and 56, respectively. Generally, as the system 10 is being operated, the valve 52 is closed. However, in the event of an overpressure in the output side of the compressor 12, for example, the valve 52 may be set to open the communication line 56 to the input side of the compressor 54.

To utilize the gauging system 10, the volume of the accumulator 22 and associated components and connecting lines, $V_a$, is determined and considered a known quantity. For example, the volume of the accumulator 22, the radiator 18 and all communication lines connected thereto from the compressor 12 to the isolation valve 28 would be considered to make up $V_a$. Similarly, the volume of the main tank containing the liquid whose quantity is to be determined is known, and is designated herein as $V_M$. Similarly, this quantity $V_M$ would include that of the main tank itself as well as any associated lines connecting the tank to the gauging system 10, for example, such as the lines 14 and 24 on the main tank side of the isolation valves 26 and 28, respectively. The gauging system 10, through the sensors 36, 40, 44 and 46, is used to determine the temperature and pressure conditions in the accumulator and the main tank before and after the compressor 12 is operated to remove gas from the main tank to the accumulator 22. These quantities are designated as follows:

$T_{ai}$ = initial accumulator temperature
$T_{af}$ = final accumulator temperature
$P_{ai}$ = initial accumulator pressure
$P_{af}$ = final accumulator pressure
$T_{mi}$ = initial main tank temperature
$T_{mf}$ = final main tank temperature
$P_{mi}$ = initial main tank pressure
$P_{mf}$ = final main tank pressure.

The volume of liquid in the main tank, $V_l$, is the difference between the tank volume $V_M$ and the volume of gas in the tank, $V_m$. The volume of the liquid, $V_l$, and the volume of the gas in the main tank, $V_m$, are both constants. The total mass of the gas, $M$, is equal to the sum of the mass of the gas in the accumulator, $M_a$, and the mass of the gas in the main tank, $M_m$, and is a constant. However, as the system 10 is operated to pump gas from the main tank to the accumulator 22, the mass of the gas in the main tank as well as the mass of the gas in the accumulator change.

In operation, the main tank containing the liquid, whose quantity is to be determined, and pressurant gas is isolated from the gauging system 10 by the isolation valves 26 and 28, and the controller 30 operates to sense the initial values of temperature and pressure $T_{ai}$ and $P_{ai}$ in the accumulator, as well as the initial values of temperature and pressure $T_{mi}$ and $P_{mi}$ in the main tank. The combination of liquid and gas in the main tank may be expected to display uniform pressure throughout in the zero or near-zero net gravity conditions for which the system 10 is particularly advantageous.

With the initial temperature and pressure measurements obtained, the compressor 12 is operated by the motor 32 with the isolation valve 26 open to pump pressurant gas from the main tank through the radiator 18 and into the accumulator 22. Since the accumulator is considerably smaller in volume than the main tank, it will be appreciated that the pressure of the gas removed from the tank to the accumulator 22 will be increased by operation of the compressor 12. The radiator 18 functions to remove the heat of compression of the gas pumped to the accumulator 22. When the gas has been removed to the accumulator 22, the isolation valve 26 is closed and the compressor 12 ceases operation. Final temperature and pressure measurements, $T_{af}$, $P_{af}$, $T_{mf}$ and $P_{mf}$ in the accumulator system and the main tank, respectively, are taken. Where the liquid vapor pressure is low, any liquid vapor being added to the pressurant gas may be ignored. Then, by operation of the controller/computer, for example, the gas law in the general form of Equation (1) is applied to determine the volume of liquid in the main tank.

$$M = \frac{PV}{RT} \quad (1)$$

where R is the gas constant and T is the absolute temperature. Since total mass of the gas in the entire system is a constant, the mass of the gas removed from the tank is equal to the mass of the gas added to the accumulator. That is, $$M_{mi} - M_{mf} = M_{af} - M_{ai} \quad (2)$$

where
$M_{mi}$ = mass of gas initially in the main tank
$M_{mf}$ = mass of gas in the main tank after gas is transferred
$M_{ai}$ = mass of gas initially in the accumulator system
$M_{af}$ = mass of gas in the accumulator system after gas is transferred.

Applying Equation (1) to each of the mass quantities of Equation (2) yields $$V_m = \frac{V_a \left( \dfrac{P_{af}}{T_{af}} - \dfrac{P_{ai}}{T_{ai}} \right)}{\dfrac{P_{mi}}{T_{mi}} - \dfrac{P_{mf}}{T_{mf}}} \quad (3)$$

All of the quantities on the right-hand side of Equation (3) are known or measured. Consequently, Equation (3) yields the volume of gas in the main tank, so that the volume of liquid in the main tank is given by $$V_l = V_M - V_m. \quad (4)$$

It will be appreciated that the application of the gas law through the above equations, for example, may be carried out to determine the volume of liquid in the tank not only in a process of removal of gas from the tank as described above, but also by a process of adding gas to the tank from the accumulator 22. The same types of measurements described above are taken, that is, the pressure and temperature conditions in the accumulator system and in the tank are determined before the gas is vented from the accumulator to the tank, and after the gas has been communicated to the tank. It will further be appreciated that in such a process, the initial pressure of the gas in the accumulator 22 is higher than the initial gas pressure in the tank, and the gas need only be vented to the tank through the isolation valve 28 over the return line 24 without the need for the operation of a compressor. However, a compressor may be utilized to raise the level of the final tank pressure above that in the accumulator system. Additionally, cooling of the gas upon expansion into the tank may be accommodated by an appropriate heat exchanger, or the like. In any event, final pressure in the main tank is greater than its initial pressure.

The two above-described processes may be used to obtain two measurements of the temperature and pressure conditions before and after in each of the two segments of the system to make two determinations of the volume of liquid in the tank. This can be done as a verification of the operation of the gauging system, for example. In such a circumstance, for example, the gas may initially be moved from the tank to the accumulator 22 in the first above-desribed process to obtain a value of the volume of liquid in the tank. Thereafter, the isolation valve 28 may be opened and the compressed gas vented back to the tank, and additional temperature and pressure measurements made both in the accumulator system and the tank. The aforementioned equations are again applied, and a second determination of the volume of liquid in the tank is obtained. When the above two-cycle process is complete, the tank is essentially back to its initial conditions, with no fluid having been wasted.

In the case of a cryogenic tank, some of the liquid may be expected to vaporize and a small amount of such vapor be carried into the accumulator system as the gas is compressed by operation of the pump. Vapor carried into the gauging system may affect the outcome of the process of determining the volume of liquid in the tank. However, if the gas return process is carried out, a different value for the volume of liquid in the tank will be obtained. Consequently, the discrepancy due to the vaporized liquid in the first half of the cycle will be detected.

For cases where the liquid vapor pressure is a significant portion of the total gas pressure in the tank, and consequently where the vapor will condense in the accumulator, an adjustment can be made to the process by substracting the vapor pressure of the liquid from the initial and final values of the pressure in the tank, that is, $P_{mi}$ and $P_{mf}$, before application of the gas law. The volume of liquid occupied by the condensed vapor in the accumulator may be calculated, but will normally have negligible effect on the result.

The effects of high vapor pressure liquid on operation of the gauging system 10, for example where a cryogenic liquid is in the main tank, may be avoided by utilizing the gauging system in the mode wherein pressurized gas in the accumulator 22 is communicated to the main tank, with temperature and pressure conditions determined before and after the gas transfer, to obtain a value for the volume of liquid in the tank, as discussed above.

The ability to operate the gauging system 10 in either direction, that is, by pumping gas into the accumulator 22 from the tank, or venting gas from the accumulator to the tank, allows multiple determinations of the volume of liquid in the tank even as the liquid is being withdrawn from the tank, or more liquid added thereto. For example, after one such measuring cycle is carried out to determine the quantity of liquid in the tank, such as the process in which gas is pumped from the tank to the accumulator 22, the isolation valves 26 and 28 may remain closed and the system 10 not operated until some later time after which liquid has been withdrawn from the tank or added thereto. Then, the gas return cycle can be carried out and another determination of the volume of liquid in the tank obtained. This process may be repeated as needed. It will also be appreciated that subsequent liquid volume determinations can be carried out in this fashion to determine whether liquid has leaked from the tank system, for example.

It will be appreciated that the liquid and gas within the main tank are randomly distributed in the zero or near-zero net gravity environment. Consequently, in order to withdraw the gas from the tank, it may be necessary to separate the gas from the liquid within the tank or to provide some means for presenting the gas at the outlet of the tank so that it may be withdrawn therefrom.

Figure 2:
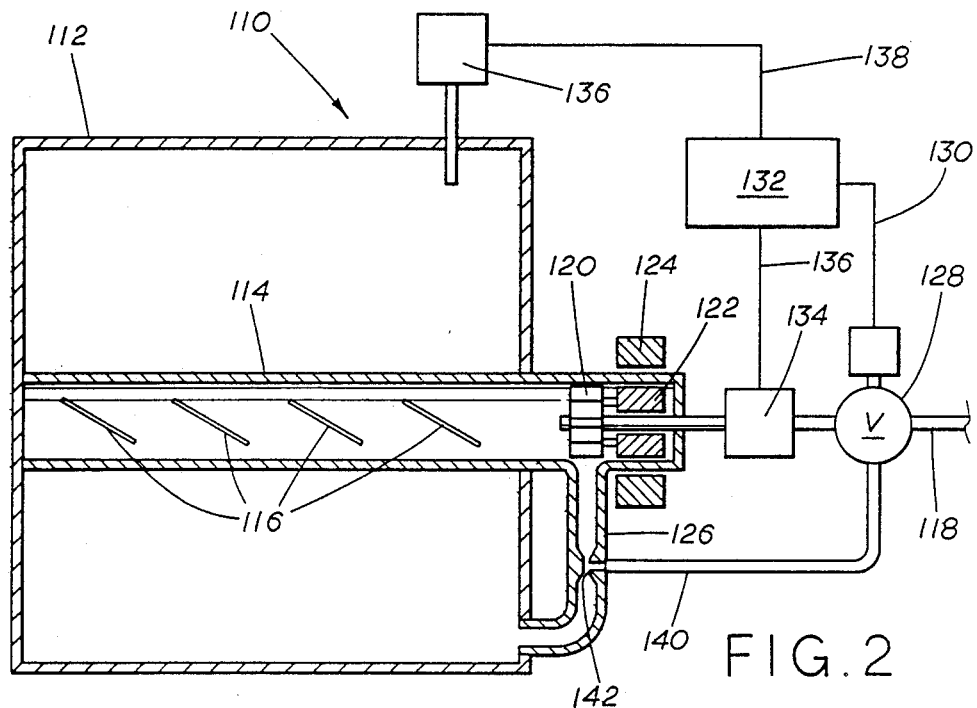
FIG. 2 is a schematic illustration of a separator system that may be utilized to remove gas from a container of liquid and pressurant gas in a zero, or near-zero gravity environment.

A separator system for removing gas from an enclosure containing both liquid and gas in a zero or near-zero net condition is shown generally at 110 in FIG. 2. A tank 112 for containing the liquid and gas combination features a vortex impeller suction tube 114 extending from one interior wall of the tank to and through the opposite wall of the tank as illustrated. Liquid and gas within the tank 112 may enter the interior of the suction tube 114 through several passages, or slots, 116 (four are illustrated) angled as shown to assist fluid movement as discussed more fully hereinafter. A fluid communication line 118 extends into the end of the suction tube 114. An impeller 120 is mounted with its blades circumscribing the end of the fluid communication line 118 within the suction tube 114, and is rotatable relative to the communication line. The fluid line 118 may continue on to the gauging system 10 of FIG. 1, and particularly to the inlet line 14 thereof. The gauging system 10 outlet line 24 may enter the tank 112 of FIG. 2 at any convenient location (not shown). Also, the temperature and pressure sensors 44 and 46, respectively, may be positioned to detect the corresponding quantities within the tank 112.

An encapsulated permanent magnet rotor 122 is also located within the suction tube 114 and generally circumscribing the fluid line 118, and is fixed to the impeller 120. Appropriate bearing mountings (not shown) are used to rotatably attach the impeller 120 and/or the rotor 122 to the fluid line 118, with the bearings being lubricated by the liquid in the tank 112. A stator 124 is positioned about the exterior of the suction tube 114, and aligned with the rotor 122, so that electrical energy provided to the stator in the normal fashion of a motor will cause the rotor, and the attached impeller 120, to rotate about the fluid line 118 within the suction tube. This arrangement of the rotor 122 and stator 124 separated by a pressure containing barrier is generally of the type provided in "canned" pumps. Such construction avoids the use of a drie shaft passing through the wall of the suction tube 114 requiring seals to prevent fluid leakage about the shaft. As an alternative, a magnetic drive of the impeller 120 may be utilized in the manner commonly known in construction and operation of industrial pumps.

The end of the fluid communication line 118 at the impeller 120 is open to receive fluid flow from the interior of the suction tube 114. In general, with the impeller 120 stationary, the gas and liquid within the tank 112 are randomly distributed throughout the tank, including the interior of the suction tube 114. When the impeller is caused to rotate, fluid within the suction tube 114 is rotated accordingly, resulting in the formation of a vortex along the longitudinal axis of the tube. With the vortex established within the suction tube 114, liquid in the vortex will tend to move toward the wall of the tube 114, and gas within the tube will occupy the center of the vortex leading to the impeller, at which point the gas may enter the open end of the fluid communication line 118. The impeller 120 may incorporate screen elements (not shown) surrounding the entrance to the fluid communication line 118. When the impeller 120 is in motion, the screen elements will deflect and sling away spattered liquid, preventing droplets from entering the fluid communication line 118.

A liquid vent circuit, or return line, 126 branches off from the suction tube 114 in the vicinity of the impeller 120 outside the tank 112, and returns to the tank at a location outside the suction tube. Liquid drawn toward the impeller 120 within the suction tube 114 by the vortex action will generally move along the interior surface of the suction tube wall to the return circuit 126, and move back to the interior of the tank 112 outside the tube 114 by means of the return line. As fluid, both liquid and gas, within the suction tube 114 is moved out of the suction tube by action of the impeller 120, additional liquid and gas within the tank 112 may enter the suction tube 114 through the tube slots 116 to enter the vortex. Fluid enters the tube 114 through the slanted slots 116 in a direction tangential to the inner wall of the tube, exhibiting a rotation to help sustain the vortex caused by the impeller 120. To assure continued fluid circulation the impeller may be of compound design, with an axial fan inducer element supplying fluid to a primary centrifugal element.

A three-way, solenoid operated valve 128 is positioned along the fluid communication line 118, and controlled, through a signal communication line 130, by a controller 132, which may be computer operated. The controller 132 monitors the fluid communication line 118 by an ultrasonic liquid detector 134 in the line, sending signals to the controller by an appropriate communication line 136. Similarly, a pressure sensor 136 detects the pressure within the tank 112 and conveys its pressure output signal to the system controller 132 by an appropriate communication line 138. A liquid bypass line 140 extends from the valve 128 to a point in the return line 126 at which a venturi throat 142 is provided in that return line.

Generally, the valve 128 is positioned to close its outlet port to the fluid communication line 118 to the right, as viewed in FIG. 2, and to open its port to the bypass line 140. This is the configuration of the system when no gas is being withdrawn from the tank 112. When gas is to be withdrawn from the tank 112, the valve 128 is positioned to close the bypass port to the bypass line 140 and to open the outlet port to the fluid communication line 118. The impeller 120 is actuated to rotate with the valve 128 so positioned to allow passage of gas along the communication line 118. As the vortex within the suction tube 114 is established by the impeller 120, gas will enter the low pressure vortex core at the nearest point to the impeller that is in contact with gas space, and will travel toward the impeller. Gas will be drawn into the fluid communication line 118 to the gauging system 10, as liquid moving along the interior of the suction tube 114 moves through the return line 126 back to the interior of the tank. It will be appreciated that this circulation of the liquid, caused by the establishment of the vortex, will cause random circulation of all fluid in the tank to help bring the temperature of the fluid within the tank to equilibrium and promote movement of the gas distributed throughout the tank at random toward the suction tube 114.

During operation of the separator system 110, if liquid enters the fluid communication line 118, it may be sensed by the liquid detector 134. Then, in response to a liquid-indicating signal from the detector 134, the control unit 132 may operate the valve 128 to close the outlet port thereof to the fluid communication line 118, and to open the bypass port to the bypass line 140. Then, all fluid entering the fluid communication line 118 will move back through the bypass line 140 to the venturi throat 142. Liquid flow along the return line 126 establishes pressure at the venturi throat 142 lower than the pressure at the impeller 120 to ensure circulation of liquid and gas through the bypass line 140. When the liquid detector 134 no longer senses liquid in the fluid communication line 118, the controller 132 may reopen the valve port to the fluid communication line to the gauging system 10, at the same time closing off the bypass port to the bypass line 140.

Once a vortex is established within the suction tube 114, flow of gas from the tank 112 along the line 118 may provide a sufficient vortex effect in the tube 114 to sustain the system operation without continuous use of the impeller 120. Thus, the impeller motor may be turned off and need not be restarted unless the vortex diminishes to an unsatisfactory extent. In any event, the impeller 120 may be turned off when only gas is present at the impeller to prevent overheating of the bearings and to conserve energy. The controller 132 may perform this function after a specified time without detecting liquid in the line 118 has elapsed. In general, the controller 132 may be preset to stop the gas removal when a specified pressure within the tank 112 has been reached, as determined by the pressure sensor 136.

Use of the tube 114 permits the establishment of a vortex within the tube's limited confines to draw off the gas rather than establishing a vortex throughout the tank 112, which would require more energy to generate. The interior of the vortex tube 114 may be polished or coated for smoothness to minimize friction between it and the liquid, thus increasing the efficiency of the generation of the vortex. The outside of the tube 114 may be coated with polytetrafluoroethylene, for example, to make it unwettable, thereby facilitating the movement of gas into the tube. The outside of the fluid line 118 within the suction tube 114 may be similarly coated to be non-wettable.

Depending on the physical arrangement of components of the particular gauging system, additional sensors may be employed to determine the mass of gas contained in various segments of the system according to the techniques disclosed herein.

It will be appreciated that the gas removal system 110 operates with little or no liquid loss into the fluid communication line to the gauging system 10. Additionally, the gas removal system 110 operates to separate the gas from the liquid without the need, for example, of accelerating the tank 112 to move the liquid toward one side thereof.

The gauging system of FIG. 1 requires no propulsive forces to be applied to the system as a whole to operate, and, therefore, no external propulsive system is required. The gas separation system 110 likewise imposes no need for such propulsive forces. Further, the present invention requires no dedicated gas source, nor any increase in tank working pressure and weight to accommodate use in a blowdown expulsion mode. All operative components of the gauging system are outside the tank, and thus there is no requirement for tank entry for repair or replacement of a component. The present invention is effectively a closed system with the tank, wasting no precious fluids that must be resupplied from earth, for example. Further, the system uses only electrical energy, which can be acquired in orbit.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A method of gauging the amount of liquid in a container of liquid and gas in low or zero gravity net conditions, comprising the following steps:
    a. providing a closed fluid system comprising an accumulator for receiving gas removed from said container, a compressor for pumping said gas from said container into the accumulator, and means for selectively connecting the compressor and accumulator to the container;
    b. determining the pressure and temperature of fluid in the container and of gas in the accumulator;
    c. pumping gas from the container into the accumulator;
    d. determining the pressure and temperature of fluid in the container and of gas in the accumulator; and
    e. utilizing the pressure and temperature values to determine the volume of gas in the container, and determining the volume of liquid in the container from the difference between the volume of the container and the volume of the gas in the container, whereby the closed system precludes the need of an external gas source, and subsequent volume determinations are made after gas is transferred from the accumulator to the container.

2. A method as defined in claim 1 further comprising the steps of providing a radiator and, with said radiator, removing the heat of compression of gas pumped into the accumulator.

3. A method as defined in claim 1 further comprising the steps of providing control means and, with the control means, operating said compressor.

4. A method of gauging the amount of liquid in a container of liquid and gas in low or zero gravity net conditions, comprising the following steps:
- a. providing a closed fluid system comprising an accumulator for receiving gas removed from said container, a compressor for pumping said gas from said container into the accumulator, and means for selectively connecting the compressor and accumulator to the container;
- b. determining the pressure and temperature of fluid in the container and of gas in the accumulator;
- c. pumping gas from the container into the accumulator;
- d. determining the pressure and temperature of fluid in the container and of gas in the accumulator;
- e. utilizing the pressure and temperature values to determine the volume of gas in the container, and determining the volume of liquid in the container from the difference between the volume of the container and the volume of the gas in the container;
- f. determining the pressure and temperature of fluid in the container and of gas in the accumulator;
- g. communicating gas from the accumulator to the container;
- h. determining the pressure and temperature of fluid in the container and of gas in the accumulator; and
- i. utilizing the pressure and temperature values to determine the volume of gas in the container, and determining the volume of liquid in the container from the difference between the volume of the container and the volume of the gas in the container.

5. A method as defined in claim 4 wherein steps f. through i. are delayed until after the amount of liquid in the container is changed.

6. A method of gauging the amount of liquid in a container of liquid and gas in low or zero gravity net conditions, comprising the following steps:
- a. providing a separator at the container for providing rotation of fluid within the container to separate gas from the liquid therein and for communicating gas out of the container, an accumulator for receiving gas removed from said container, a compressor for pumping said gas from said container into the accumulator, and means for selectively connecting the compressor and accumulator to the container;
- b. determining the pressure and temperature of fluid in the container and of gas in the accumulator;
- c. pumping gas from the container into the accumulator;
- d. determining the pressure and temperature of fluid in the container and of gas in the accumulator; and
- e. utilizing the pressure and temperature values to determine the volume of gas in the container, and determining the volume of liquid in the container from the difference between the volume of the container and the volume of the gas in the container.

* * * * *